United States Patent Office 3,058,782
Patented Oct. 16, 1962

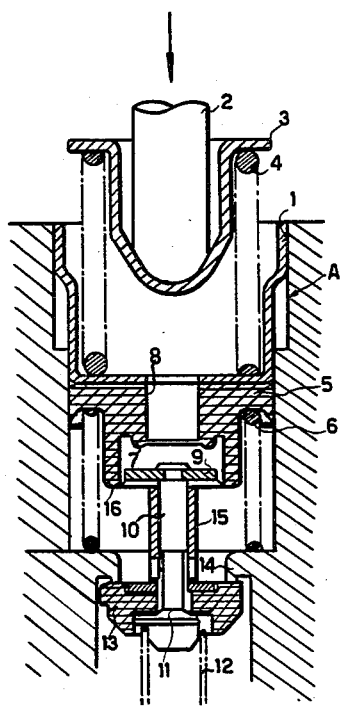

3,058,782
COMPRESSED AIR DISTRIBUTOR PARTICULARLY FOR MOTOR VEHICLE BRAKING SYSTEMS
Giuseppe Alfieri, Milan, Italy, assignor to Fabbrica Italiana Magneti Marelli S.p.A., Milan, Italy
Filed June 5, 1961, Ser. No. 114,807
Claims priority, application Italy June 15, 1960
6 Claims. (Cl. 303—54)

The present invention refers to a compressed air distributor particularly for motor vehicle braking systems.

In normal commonly known distributors, the metal piston includes a metal seat for the exhaust valve, either as an integral part of the piston or as a supplementary part of the piston, and this seat is sealingly engaged by a valve element which is fitted with a rubber packing seal, and which forms a single body with the pre-inlet or inlet valve element. The metal piston is fitted with a rubber packing seal which is not an integral part of the piston itself.

The object of the present invention is to provide a more simple and more economical constructional arrangement of the assembly, and is substantially characterised by the fact that the piston packing seal is formed with the axial air tight seat for the exhaust valve as an integral part of the piston packing seal.

The invention will be described with reference to the attached schematic drawing which is given only as an indicative example, and in which the FIGURE shows a preferred arrangement of the distributor in cross section.

In said figure: A indicates the valve body in which slides the piston 1 in the manner commonly known to those skilled in the art to which the present invention pertains, said piston being operated by the vehicle driver by means of push rod 2 engaged in a cup 3.

Between piston 1 and cup 3 is located the helical spring 4 which serves to achieve the required braking pressure. The packing seal 5 of piston 1 rests against the inner end of the piston, where it is retained by the helical return spring 6 in such a manner as to form an axially projecting annular seat 7 having a passage 8, and thus constituting the seat for the exhaust valve. The closure element of the exhaust valve is constituted by a metal disc shaped element 9 located at the extremity of a valve stem 10, and which at its other extremity is fitted with the pre-inlet valve element 11 which is influenced by spring 12. The seat for the pre-inlet valve element is constituted by the packing seal 13 of the inlet valve which sealingly engages a seat 14 of body A.

Stem 10 slides axially inside of the tubular stem 15 of the inlet valve 13.

Packing seal 5 is furnished with an axial tubular projection 16 in which the disc shaped element 9 slides in such a manner as to provide the guide for the exhaust valve.

The arrangement operates in the following manner. Normally, the parts occupy the position shown in the drawings, and a radial passage in the body A allows the system to be connected to exhaust by virtue of the clearance between the valve element 9 and the tubular portion 16 of the packing member 5, this space communicating with atmosphere through the axial passage in the packing member 5 and in the inner head of the piston 1. To operate the brakes, the rod 2 is moved inwardly by a connection to the brake pedal of the vehicle. As the rod 2 is moved inwardly, the piston 1 is moved inwardly and the packing member 5 is moved toward the exhaust valve element 9. After predetermined movement, the annular seat 7 of the packing member 5 is engaged with the valve member 9 and thus closes the connection to the atmosphere. Immediately after such closing, and due to the inward movement of the stem 10, the pre-inlet valve 11 is lifted from its seat and, as the valve element 9 engages the tubular stem 15, a main inlet valve 13 is disengaged from its seat 14. Thereby, compressed air is supplied to the radial passage of the body A leading to the brakes. When the brake pedal is released, the parts re-assume the position shown in the drawings so that the brake cylinders are again connected to atmosphere.

In actual practice the particulars of the constructional arrangement may vary without exiting from the scope of the present invention.

I claim:

1. In an air distributor particularly for motor vehicle braking systems, a body formed with a cylindrical bore; a metal piston slidably mounted in said bore and having an inner head lying in substantially a diametric plane; manually actuable means selectively operable to move said piston axially inwardly of said bore; a generally cylindrical packing member slidable in fluid-tight engagement in said bore inwardly of said piston; spring means engaged between said packing member and said body and biasing said packing member to engage said inner head, said inner head and said packing member being formed with substantially axially aligned intercommunicating exhaust apertures therethrough; the inner end of said packing member being integrally formed with an axially projecting valve seat surrounding the exhaust aperture therethrough; and an exhaust valve element mounted in said body and sealingly engageable with said valve seat upon axially inward movement of said piston and said packing member; said body being formed with a working fluid passage normally communicating with said exhaust apertures when said valve element is disengaged from said valve seat, and the exhaust aperture in said inner head communicating with atmosphere.

2. In an air distributor particularly for motor vehicle braking systems, as claimed in claim 1, said exhaust valve element comprising a circular metal disc.

3. In an air distributor particularly for motor vehicle braking systems, as claimed in claim 2, the inner end of said packing member being integrally formed with an axially extending tubular projection extending axially beyond said valve seat and acting as a guide for said metal disc exhaust valve element.

4. In an air distributor particularly for motor vehicle braking systems, as claimed in claim 1, said body being formed with a compressed air inlet passage; a compressed air inlet valve controlling communication between said compressed air inlet passage and said working fluid passage, and normally closed; said exhaust valve element being operatively connected to said compressed air inlet valve and effective to disengage the latter from a valve seat to establish communication between said compressed air passage and said working fluid passage upon inward movement of said piston and said packing member with said exhaust valve engaged with said valve seat on said packing member.

5. In an air distributor particularly for motor vehicle braking system, as claimed in claim 4, said compressed air passage being axially aligned with said bore, and said body being formed with an annular valve seat extending axially into said compressed air passage; said compressed air inlet valve including a valve element normally engaged with said last-named valve seat and formed with an axial passage therethrough; and a pre-inlet valve controlling flow through the axial passage in said inlet valve and secured to a stem which, at its opposite end, is secured to said exhaust valve element.

6. In an air distributor particularly for motor vehicle braking systems, as claimed in claim 5, said compressed air inlet valve comprising a substantially cylindrical member of packing material having a diametrically extending plane surface engageable with said last-named valve seat, and integrally formed with a valve seat for said pre-inlet valve member; said compressed air inlet valve having a tubular stem engaging said first-mentioned stem and having an end normally spaced slightly from said exhaust valve element; whereby, upon continued inward movement of said piston and said packing member, said exhaust valve element will, through its associated stem, open said pre-inlet valve and, immediately thereafter, engage the end of said tubular stem to open said compressed air inlet valve.

References Cited in the file of this patent

UNITED STATES PATENTS

| | | |
|---|---|---|
| 2,036,053 | Kliesrath | Mar. 31, 1936 |
| 2,259,809 | Freeman | Oct. 21, 1941 |
| 2,680,654 | Edge et al. | June 8, 1954 |